United States Patent
Penning et al.

(12) 
(10) Patent No.: US 6,599,966 B2
(45) Date of Patent: Jul. 29, 2003

(54) POLYCARBONATE-POLYESTER COMPOSITIONS WITH ENHANCED FLOW

(75) Inventors: Jan Paul Penning, Maastricht (NL); Gerrti de Wit, Ossendrecht (NL)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/738,497

(22) Filed: Dec. 15, 2000

(65) Prior Publication Data
US 2002/0132889 A1 Sep. 19, 2002

(51) Int. Cl.[7] ............ C08L 1/00; C08L 67/00; C08K 5/50

(52) U.S. Cl. .................................. 524/156

(58) Field of Search ........................ 524/156

(56) References Cited

U.S. PATENT DOCUMENTS

| | | |
|---|---|---|
| 2,465,319 A | 3/1949 | Whinfield et al. |
| 2,999,835 A | 9/1961 | Goldberg |
| 3,038,365 A | 6/1962 | Peterson |
| 3,047,539 A | 7/1962 | Pengily |
| 3,153,008 A | 10/1964 | Fox |
| 3,169,121 A | 2/1965 | Goldberg |
| 3,334,154 A | 8/1967 | Kim |
| 3,808,180 A | 4/1974 | Owens |
| 3,953,539 A | 4/1976 | Kawase et al. |
| 4,001,184 A | 1/1977 | Scott et al. |
| 4,038,258 A | 7/1977 | Singh et al. |
| 4,096,202 A | 6/1978 | Farnham et al. |
| 4,123,436 A | 10/1978 | Holub et al. |
| 4,131,575 A | 12/1978 | Adelmann et al. |
| 4,156,069 A | 5/1979 | Prevorsek et al. |
| 4,180,494 A | 12/1979 | Fromuth et al. |
| 4,209,427 A | 6/1980 | Williams |
| 4,260,693 A | 4/1981 | Liu |
| 4,269,731 A | 5/1981 | Mack |
| 4,292,233 A | 9/1981 | Binseck et al. |
| 4,663,421 A | 5/1987 | Mark |
| 4,943,380 A | 7/1990 | Sugiura et al. |
| 5,814,712 A | 9/1998 | Gallucci et al. |
| 5,907,026 A | 5/1999 | Factor et al. |
| 2001/0016626 A1 | 8/2001 | Vollenberg et al. |

FOREIGN PATENT DOCUMENTS

| | | |
|---|---|---|
| JP | 05171024 | 7/1993 |
| JP | 06041407 | 2/1994 |
| JP | 06041408 | 2/1994 |
| JP | 06089499 | 3/1994 |
| JP | 07062215 | 3/1995 |
| JP | 07165805 | 6/1995 |
| JP | 07188539 | 7/1995 |
| JP | 07292234 | 11/1995 |
| JP | 07304942 | 11/1995 |
| JP | 08059975 | 3/1996 |
| JP | 08092819 | 4/1996 |

OTHER PUBLICATIONS

JP 07 166039 (abstract), Japan, 1995.
JP 07 304942 (abstract), Japan, 1995.

*Primary Examiner*—James J. Seidleck
*Assistant Examiner*—U. K. Rajguru
(74) *Attorney, Agent, or Firm*—Oppendahl & Larson LLP

(57) ABSTRACT

A molding composition comprising (a) from 10 to 90 weight percent of a polyester resin; (b) from 90 to 10 weight percent of an aromatic polycarbonate, polyarylate, polyester carbonate resin or blend thereof; and (c) a flow improving amount of lignin and/or a compound having a phosphonium sulfonate group.

22 Claims, No Drawings

POLYCARBONATE-POLYESTER COMPOSITIONS WITH ENHANCED FLOW

FIELD OF THE INVENTION

This invention relates to polycarbonate-polyester compositions having a flow enhancing additive.

BACKGROUND OF THE INVENTION

Polyester resins derived from terephthalic acid and reactive derivatives thereof, such as dimethyl terephthalate, and alkanediols have been known for some time and have become important constituents for moldable compositions. Workpieces molded from such polyester resin compositions, alone, or combined with reinforcements, offer a high degree of surface hardness, solvent resistance, abrasion resistance, and high gloss. More recently, blends of such polyester resins with one or more second resins have become of significant commercial interest because such second resins, carefully selected, can greatly improve impact strength, as well as tensile strength, modulus, dimensional stability and distortion temperature under load in parts molded from such compositions. Such second resins can comprise aromatic polycarbonate resins as described for example, in Kawase et al, U.S. Pat. No. 3,953,539 and related polyester-carbonate and polyarylate resins.

Impact-modified PC/PBT blends are very suitable materials for exterior automotive applications (e.g. as bumpers). A good flowing material during molding is a necessity for that molding cycles while the mechanical properties as impact of the molded part should be excellent in order to pass the application specifications. Improvement of the impact/flow balance cannot be simply done by changing the PC/PBT-ratio or polymer molecular weights or by reducing the impact modifier content. So, the problem to be solved is to increase the flow behavior of an impact modified PC/PBT blend without major effects on ductility.

Hence, it is desirable to increase the flow behavior of an impact modified PC/PBT blend without major effects on ductility.

None of following referenced patents describe the use of lignin-type of compounds or phosphonium sulfonate type of compounds as a flow improver in a blend of PC with PBT, while the other properties as impact and heat resistance stay for the major part the same.

U.S. Pat. No. 4,209,427; GE-Patent filed 1977: flame-retardant polycarbonate composition. This patent describes that the use of lignin or lignosulfonates can be used as a flame-retardant additive. Typical amounts are 0.5–1.0 part per 100 parts PC.

U.S. Pat. No. 4,943,380; Patent from Takemoto Yushi Kabushiki Kaisha, filed 1989: anti-static resin composition with transparency containing phosphonium sulphonate. The use of 0.1–10% of phosphonium sulphonate is described.

U.S. Pat. No. 4,038,258; Patent from DuPont, filed 1976: anti-static composition containing an aliphatic polyester or polyetherester and a phosphonium salt. Polyesters having a Tg<25 C., containing 0.02–35% of a phosphonium salt.

PAJ-08059975 (publ.no.); Patent from Teijin, filed 1994: To obtain a PC, excellent in high temp. stability, melt moldability, hydrolytic resistance, a (phosphonium) sulfonate is added (0.01–500 ppm) during the reaction system to obtain a PC with desired viscosity.

PAJ-07304942; Patent from Mitsubishi Chem.Corp., filed 1994: Blend of PC with 0.1–20 pts. wt phosphonium sulfonate. Mentioned advantages: flowability, mechanical properties, anti-static properties.

PAJ-06089499 and 07292234; Patents from Teijin, filed 1994: Blend of PC (45–93%), polyalkyleneglycol (12–15%) and polyester with groups attached to it (5–40%) in order to get anti-static properties.

PAJ-07188539; Patent from Nippon GII Plast KK, filed 1993: Blend of a specific copolycarbonate (eg based on BPA and resorcinol) with 0.1–10% of a phosphonium sulfonate to get ant-static properties.

PAJ-07165905; Patent from Teijin, filed 1993: Production of stabilized PC-resin by adding a phosphonium sulfonate on and after the completion of a reaction in solution polymerization.

PAJ-07062215 and 05171024; Patents from Mitsubishi Chem. (Kasei) Corp., filed 1993: Blends of 100 pts PC with 0.1–20 pts phosphonium sulfonate and 0.01–3 pts sulfur containing ester compound to get antistatic properties.

PAJ-08092819; Patent from Asahi Chem.Ind.Co., filed 1994: Blend of a polyester copolymerized with 1 mol % isophthalic acid component containing a metal sulfonate group with 0.01–0.3% of P-cpd as viscosity reducing agent. P-cpd is pref. a phosphonium phosphonate.

PAJ-06279658 and 06263855; Patents from Teijin, filed 1993: Modified polyester (polyester-ionomer), synthesized through copolymerization using a phosphonium sulfonate compound.

PAJ-06041408 and -06041407: Patents from Toray Ind., filed 1991: Modified polyester: polyester (eg PET) and incorporated therein 1–30% ester-forming phosphonium sulfonate compound and 1–20% polyalkyleneglycol.

SUMMARY OF THE INVENTION

It has been found that the presence of lignin or phosphonium sulfonate compounds provides highly improved flow properties in a PC/PBT blend, while mechanical and physical properties are remained for a major part.

A molding composition comprising (a) from 10 to 90 weight percent of a polyester resin; (b) from 90 to 10 weight percent of an aromatic polycarbonate, polyarylate, polyester carbonate resin or blend thereof; and (c) a flow improving amount of lignin and/or a compound having a phosphonium sulfonate group.

DESCRIPTION OF THE PREFERRED EMBODIMENTS

The phosphonium sulfonate flow enhancing additive is preferably a compound of the formula

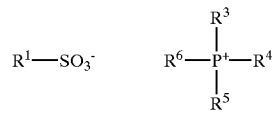

(R1-SO3-P(-R3,-R4,-R5,-R6)), wherein $R^1$ is 1–40 Carbon alkyl or aryl or alkylaryl; and $R^3$–$R^6$ are each H, 1–10 Carbon, alkyl, or aryl. More preferably the phosphonium is a tetrabutylphosphonium dodecylbenzene sulfonate. Typical phosphonium salts include methyltributylphosphonium xylenesulfonate, tetrabutylphosphonium benzenesulfonate, methyltricyclohexylphosphonium xylenesulfonate, benzyltriphenylphosphonium xylenesulfonate, tetraoctylphosphonium phenyl sulfonate, and di(methyl-tribenzylphosphonium) phenyl sulfonate.

The lignin flow enhancing additive is selected from the group consisting of a lignin, kraft lignin, lignosulfonates and mixtures thereof. As set froth in U.S. Pat. No. 4,209,427, while complete determination of the structure of lignosulfonates apparently as not been achieved, it is known that the basic lignin monomer unit is a substituted phenyl-propane. The lignosulfonates are metallic sulfonate salts prepared commercially from the lignin of sulfite pulp-mill liquors as known in the art. They are described as anionic polyelectrolytes whose molecular weights vary between 1,000 and 20,000. Additionally, the lignosulfonates can be substituted with the substituent consisting of an electron withdrawing radical. Preferably the electron withdrawing radical or substituent is the halo-, nitro-, trihalomethyl or cyano withdrawing radical or mixtures thereof. The electron withdrawing phenomenon, or as it is also referred to as electronegativity, is defined in Basic Principles of Organic Chemistry by Roberts and Caserio, 1964 (pages 185–186), and Physical Organic Chemistry by Jack Hine, McGraw-Hill Book Company, Inc. 1962 (pages 5, 32 and 85–93). Briefly, the electron withdrawing phenomenon is where the radical has a strong affinity for a negative charge, namely electrons, but still remains covalent and does not form an ion. It is considered that a section of polymeric lignosulfonates can have the structure shown in U.S. Pat. No. 4,209,427 wherein M is an alkali or alkaline earth metal in the lignosulfonate.

The lignin additive is preferable present in an amount of 0.1–5 wt %, more preferably in an amount of 0.3–3 wt %, and most preferably in an amount of 0.5–2.0 wt %. The phosphoniun sulfonate compound is preferable present in an amount of 0.03–3 wt %, preferably in an amount of 0.05–1.5 wt %, most preferably in an amount of 0.1–1.0 wt %.

In a preferred molding composition, polycarbonate is present in an amount of 5–95 wt % and the polyester in an amount of 95–5 wt %, more preferably the polycarbonate and polyester are present in an amount of 40–75 wt %, respectively 25–60 wt %. The polycarbonate may be a polycarbonate ester based on bisphenolacetone, and the polyester is a polyester based on terephthalic units and a C2–C15 diol. The molding composition may include impact modifiers and stabilizers. Preferred impact modifiers include methacrylate butadiene rubber, acrylic rubber and polyolefin copolymers containing acrylic, methacrylic, vinyl ester or vinyl ether derived units.

Polyester components include crystalline polyesters such as polyesters derived from an aliphatic or cycloaliphatic diol, or mixtures thereof, containing from 2 to about 15 carbon atoms and at least one aromatic or aliphatic dicarboxylic acid. Preferred polyesters are crystalline thermoplastics derived from an aliphatic diol and an aromatic dicarboxylic acid having repeating units of the following general formula:

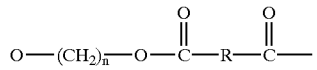

wherein n is an integer of from 2 to 15. R is a C6–C20 radical comprising a dicarboxylated residue derived from a dicarboxylic acid.

Examples of aromatic dicarbxcylic acids represented by the dicarboxylated residue R are isophthalic or terephthalic acid, 1,2-di(p-carboxyphenyl)ethane, 4,4'-dicarboxydiphenyl ether, 4,4' bisbenzoic acid and mixtures thereof. All of these acids contain at least one aromatic nucleus. Acids containing fused rings can also be present, such as in 1,4-1,5- or 2,6-naphthalenedicarboxylic acids. Aliphatic dicarboxylic acids, especially cyclic dicarboxylic acids or derivatives may be used. The preferred dicarboxylic acids are terephthalic acid, isophthalic acid, cyclohexane dicarboxylic or mixtures thereof.

The most preferred polyesters are poly(ethylene terephthalate) "PET", and poly(butylene terephthalate), "PBT" and poly(propylene terephthalate) "PPT".

Also contemplated herein are the above polyesters with minor amounts, e.g., from about 0.5 to about 25 percent by weight, of units derived from aliphatic acids, diamines and/or aliphatic polyols to form copolyesters. The aliphatic polyols include glycols, such as poly(ethylene glycol) and poly(butylene glycol). Such polyesters can be made following the teachings of, for example, U.S. Pat. Nos. 2,465,319 and 3,047,539.

The preferred poly(1,4-butylene terephthalate) resin used in this invention is one obtained by polymerizing a glycol component of at least 70 mole %, preferably at least 80 mole %, of which consists of tetramethylene glycol and an acid component at least 70 mole %, preferably at least 80 mole %, of which consists of terephthalic acid, and polyester-forming derivatives therefore.

The polyesters used herein have an intrinsic viscosity of from about 0.4 to about 2.0 dl/g. as measured in a 60:40 phenol/tetrachloroethane mixture or similar solvent at 23–30° C. VALOX Registered TM 315 polyester is particularly suitable for this invention. Preferred PBT resins have an intrinsic viscosity of 1.1 to 1.4 dl/g.

Typically polycarbonates are prepared by reacting a dihydric phenol with a carbonate precursor, such as phosgene, a haloformate or a carbonate ester. Generally speaking, such carbonate polymers may be typified as possessing recurring structural units of the formula

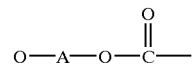

wherein A is a divalent aromatic radical of the dihydric phenol employed in the polymer producing reaction. Preferably, the carbonate polymers used to provide the resinous mixtures of the invention have an intrinsic viscosity (as measured in methylene chloride at 25° C.) ranging from about 0.30 to about 1.00 dl/g. The dihydric phenol which may be employed to provide such aromatic carbonate polymers are mononuclear or polynuclear aromatic compounds, containing as functional groups two hydroxy radicals, each of which is attached directly to a carbon atom of an aromatic nucleus. Typical dihydric phenols are: 2,2-bis(4-hydroxyphenyl) propane; hydroquinone; resorcinol; 2,2-bis (4-hydroxyphenyl) pentane; 2,4'-(dihydroxydiphenyl) methane; bis(2 hydroxyphenyl) methane; bis(4-hydroxyphenyl) methane; bis(4-hydroxy-5-nitrophenyl) methane; 1,1-bis(4-hydroxyphenyl) ethane; 3,3-bis(4-hydroxyphenyl) pentane; 2,2-dihydroxydiphenyl; 2,6-dihydroxynaphthalene; bis(4-hydroxydiphenyl)sulfone; bis(3,5-diethyl-4-hydroxyphenyl) sulfone; 2,2-bis(3,5-dimethyl4-hydroxyphenyl)propane; 2,4'-dihydroxydiphenyl sulfone; 5'-chloro-2,4'-dihydroxydiphenyl sulfone; bis-(4hydroxyphenyl)diphenyl sulfone; 4,4'-dihydroxydiphenyl ether; 4,4'-dihydroxy-3,3'-dichlorodiphenyl ether; 4,4-dihydroxy-2,5-dihydroxydiphenyl ether; and the like.

Other dihydric phenols which are also suitable for use in the preparation of the above polycarbonate resins are disclosed in U.S. Pat Nos. 2,999,835; 3,038,365; 3,334,154; and 4,131,575.

These aromatic polycarbonates can be manufactured by known processes, such as, for example and as mentioned above, by reacting a dihydric phenol with a carbonate precursor, such as phosgene, in accordance with methods set forth in the above-cited literature and in U.S. Pat. No. 4,123,436, or by transesterification processes such as are disclosed in U.S. Pat. No. 3,153,008, as well as other processes known to those skilled in the art.

It is also possible to employ two or more different dihydric phenols or a copolymer of a dihydric phenol with a glycol or with a hydroxy- or acid-terminated polyester or with a dibasic acid in the event a carbonate copolymer or interpolymer rather than a homopolymer is desired for use in the preparation of the polycarbonate mixtures of the invention. Branched polycarbonates are also useful, such as are described in U.S. Pat. No. 4,001,184. Also, there can be utilized blends of linear polycarbonate and a branched polycarbonate. Moreover, blends of any of the above materials may be employed in the practice of this invention to provide the aromatic polycarbonate.

These polycarbonates may be branched or linear and generally will have a weight average molecular weight of from about 10,000 to about 200,000, preferably from about 20,000 to about 100,000 as measured by gel permeation chromatography. The polycarbonates of the invention can employ a variety of end groups to improve performance. Bulky mono phenols, such as cumyl phenol, are preferred.

Preferred resins for enhanced weatherabilty and UV resistance are esters of aromatic dicarboxylic acids and bisphenols known as polyarylates. Polyarylate copolymers, with carbonate linkages in addition to the aryl ester linkages, known as polyester-carbonates, are also preferred. These resins may be used alone or in combination with each other or more preferably in combination with bisphenol polycarbonates. These resins can be prepared in solution or by melt polymerization from aromatic diacarboxylic acids or their ester forming derivatives and bis phenols and their derivatives. Suitable dicarboxylic acids are iso and terephthalic acid, their esters or acid chlorides. A preferred bisphenol is bis phenol A or its diacetate derivative. Polyester carbonates and polyarylates may also contain linkages derived from hydroxy carboxylic acids such as hydroxy benzoic acid. The most preferred polyester carbonate and polyarylates are derived from bisphenol A and mixture of iso and tere phthalic acid and are amorphous resins. U.S. Pat. No. 4,663,421 describes suitable polyarylates and U.S. Pat. Nos. 3,169,121; 4,156,069 and 4,269,731 describe suitable polyester-carbonates. All 4 patents are hereby incorporated by reference.

The aromatic polycarbonate, polyarylate, polyester carbonate resin can comprise a polyester carbonate to polycarbonate or polyarylate to polycarbonate ratio of 90:10 to 10:90.

Additional resin components may include, an effective amount of any of the known impact modifiers useful for polyesters and polyester blends. These may be added to the compositions by themselves or in combination with the aforementioned aromatic polycarbonates or polyesters. Useful impact modifiers generally comprise an acrylic or methacrylic grafted polymer of a conjugated diene or an acrylate elastomer, alone or co-polymerized with a vinyl aromatic compound. Other grafted polymers are the core-shell polymers of the type available from Rohm & Haas, for example ACRYLOID EXL2691 and ACRYLOID EXL3330. In general these impact modifiers contain units derived from butadiene in combination with a vinyl aromatic compound, acrylate, or akylacrylate ester such as methacrylate. The aforementioned impact modifiers are believed to be disclosed in Fromuth, et al., U.S. Pat. No. 4,180,494; Owens, U.S. Pat. No. 3,808,180; Farniham, et al., U.S. Pat. No. 4,096,202; and Cohen, et al., U.S. Pat. No. 4,260,693, all incorporated herein by reference. The impact modifier may comprise a two stage polymer having either a butadiene or n-butyl acrylate based rubbery core and a second stage polymerized from methylmethacrylate alone or in combination with styrene. Also present in the first stage are cross linking monomers and graft linking monomers. Examples of the cross linking monomers include 1,3-butylene diacrylate, divinyl benzene and butylene dimethacrylate. Examples of graft linking monomers are allyl acrylate, allyl methacrylate and diallyl maleate.

Additional preferred impact modifiers are of the type disclosed in U.S. Pat. No. 4,292,233, incorporated by reference. These impact modifiers comprise, generally, a relatively high content of a partially cross-linked butadiene polymer grafted base having grafted thereon acrylonitrile and styrene copolymers.

The most preferred impact modifiers are polyolefin copolymers with vinyl epoxide derived units. Such epoxide functional copolymers may be prepared from an olefin, such as ethylene and glycidyl acrylate or methacrylate. Other non functionalized vinyl containing monomers may also be incorporated such as alkyl acrylate or methacrylate, vinyl esters and vinyl ethers. Suitable epoxy containing polyolefin copolymers and terpolymers are described in U.S. Pat. No. 5,907,026 (herein incorporated by reference). The most preferred impact modifiers are ethylene-alkyl methacrylate-glycidyl methacrylate (EMA-GMA) terpolymers. Such epoxy olefin impact modifiers are preferred to be used at 1 to 5% loading.

The UV resistance and weathering performance of the blends of the invention can be enhanced by addition of ultraviolet radiation absorbers. Benzotriazole UV absorbers are preferred for instance commercially available TINUVIN 234, MIXXIM BB/200 and CYASORB 5411. Other suitable UV absorbers are described in U.S. Pat. No. 5,907,026 hereby incorporated by reference. UV absorbers are used at any effective concentration generally from 0.1–2.0 wt.% of the entire mixture.

When combining polycarbonate, polyarylates or polyester-carbonates with polyester resins it is very desirable to use special stabilizers, often referred to as quenchers, to suppress polycarbonate polyester reaction. These stabilizers are used at a level of 0.01–10 weight percent and preferably at a level of from 0.05–2.0 weight percent. The stabilizers include an effective amount of an acidic phosphate salt; an acid, alkyl, aryl or mixed phosphite having at least one hydrogen or alkyl group; a suitable metal phosphate salt, preferably a Li, Na, K, Mg, Ca or Zn salt; a phosphorus oxo acid, a metal acid pyrophosphate or a mixture thereof. The suitability of a particular compound for use as a stabilizer and the determination of how much is to be used as a stabilizer may be readily determined by preparing a mixture of the polyester component and the polycarbonate with and without the particular compound and determining the effect on melt viscosity or color stability or the formation of interpolymers. These stabilizers are further described in U.S. Pat. No. 5,441,997 in column 6, line 48 to column 7, line 10. This text is incorporated by reference into the present application.

In order to achieve the full benefits of this invention the type and amount of quencher should be chosen so that the colored resin composition is substantially free of particulates. Organic substituted quenchers like; partially esterified phosphorous acid, an acid, alkyl, aryl or mixed phosphite having at least one hydrogen or alkyl group, phosphoric or phosphorous acids are preferred. Mineral quenchers that will act as a particulate filler in the blend are less preferred but may be acceptable at a low level. Similarly any significant level of a particulate additive such as carbon black or titanium dioxide may be detrimental to gloss retention depending on the severity of the weathering conditions and the nature of the polyester blend matrix. The appropriate level of particles allowed into the blend will depend on the matrix and the length of weathering and can be determined using the process of our invention. Polyester blends of the invention with UV stabilizer and further containing at least some level (>5% preferred, >10% more preferred) of polyester-carbonate or polyarylate resins will have the best gloss retaining capability under severe weathering conditions. Such polyester polyarylate or polyester-carbonate blends will better tolerate the presence of low levels of particulates than blends of polyester with just aromatic polycarbonate (for examples Bis Phenol A-PC). In any event the gloss retention of all compositions of the invention will benefit from the absence of particulates.

The blends of the invention comprise less than 5 percent by weight additional ingredients which may be added to contribute to additional desirable properties such as: good mechanical properties, oxidation resistance, good processability, i.e. short molding cycle times, good flow, and easy release from the molding tool. Preferred are antioxidants such as hindered phenols, thioesters, phosphonites and phosphites. Mold release agents, especially low molecular weight polyesters such as pentaerythritol tetrastearate (PETS), are also preferred.

The method of blending the compositions can be carried out by conventional techniques. One convenient method comprises blending the polyester, polycarbonate, colorants and other ingredients in powder or granular form, extruding the blend and comminuting into pellets or other suitable shapes. The ingredients are combined in any usual manner, e.g., by dry mixing or by mixing in the melted state in an extruder, on a heated mill or in other mixers. Colorants or other portions of the blend may be added to the extruder downstream of the throat feed port.

Although it is not essential, best results are obtained if the ingredients are pre compounded, pelletized and then molded. Pre compounding can be carried out in conventional equipment. For example, after predrying the polyester and polycarbonate resins, the resins may be blended with other ingredients and melt mixed on a single or twin screw extruder. The ingredients can be added all together or fed in portions into different areas of the melt mixing device. It may be advantageous to pre compound some ingredients of the blend before mixing with the remainder of the blend for example as described in U.S. Pat. No. 5,814,712 hereby incorporated by reference.

In the most preferred case using BPA polycarbonate, a polyester-carbonate and PBT or PET, a generally suitable machine temperature will be from about 240° C. to about 300 ° C. The pre-compounded composition can be extruded and cut or chopped into molding compounds, such as conventional granules, pellets, etc. by standard techniques. The compositions can be molded in any equipment conventionally used for thermoplastic compositions. For example, good results will be obtained in an injection molding machine, with conventional cylinder temperatures, e.g., 250° C. to 275° C., and conventional mold temperatures, e.g., 65° to 90 ° C.

The following examples are designed to illustrate the scope of the invention and should not be construed to limit the claims in any manner whatsoever.

EXAMPLES

The formulations were made by dryblending the polymeric compounds together with the impact modifier, stabilizers, and flow improvers. Each dryblend was then melt-blended in a Prism 16 mm TSE corotating extruder or using a ZSK-25 TSE extruder. The temperature of the melt was about 265 C. and the screw speed was about 300 rpm. The extrudate was pelletized, dried at about 110 C. for 2 hours and then injection molded into test specimen employing an injection molding machine at a melt temperature in the barrel of the injection molding machine of about 265 C. and a mold temperature of about 60 C.

The test specimen were evaluated for tensile strengths in accordance with ISO 527 and Falling Dart impact (FD) in accordance with ISO 6603/2 at −10 C. and −20 C. The Izod Notched impact (INI) was measured in accordance with ISO180. The MVR was tested using the pelletized extrudate according to ISO 1133 at 265 C. and 2.16 kg. The Melt viscosity was measured in accordance to ISO 11443 at 265 C. at 1500 s-1. The Vicat B/120 was measured according to ISO 306.

Where amounts are in terms of percent they are percent by weight unless otherwise stated. The ingredients employed in the examples are as follows:

PC: Polycarbonate with a Tg of 145 C., and IV (in methylene chloride) of 49.0 and molecular weight of appr. 23,000.

PBT: Polybutyleneterephthalate with a Tm of 225 C. Two viscosities are used, a PBT-1 with a MVR (250 C./2.16 kg) of about 105 and a PBT-2 with a MVR of about 9 cm3/10 min.

PET: Polyethylene terephthalate with a Tm of 250 C. and a MVR (280 C./2.16 kg) of about 20 (cm3/10 min)

MBS: Methylmethacrylate-butadiene-styrene copolymer; core/shell impact modifier Paraloid EXL2600 from Rohm & Haas.

PPC: Copolyestercarbonate, known as bisphenol acetone based poly(phthalate carbonate) with a Tg around 170 C.

PCT: Poly (1,4-cyclohexyl-dimethylene terephthalate) with a Tg around 90 C., and Tm around 280 C.

ASA: A High rubber grafted Styrene-Acrylonitril-Butylacrylate copolymer with a S/A/BA ratio of 36/19/45.

Lignin: Indulin AT from Westvaco Chemicals (USA) has been used. It is a purified form of kraft lignin and free of all hemi cellosic material. EPA-202: EPA-202 a phosphonium sulfonate from Takemoto Fat and Oil Ltd (Japan) has been used. It is a tetrabutylphosphonium dodecylbenzene sulfonate.

All formulations contain an additive package consisting of anti-oxidants, metal scavenger, release agent, etc.

The formulations and test results have been summarized in Table 1. The results clearly show that the presence of lignin (formulations 4–7) or EPA-202 (formulations 8–10) in PC/PBT blends improves the flow significantly (higher MVR, lower MV-values). The results show also that at high loadings of lignin (>5 wt %) the impact values drop. At higher loadings of EPA-202 (>circa 1.5 wt %) the impact becomes less as well, and the Vicat drops somewhat. So the preferred amounts of lignin are below 5 wt % and for the phosphonium sulfonate below 1,5 wt %.

TABLE 1

PC/PBT formulations

| X | 1(ref) | 2(ref) | 3(ref) | 4 | 5 | 6 | 7 | 8 | 9 | 10 |
|---|---|---|---|---|---|---|---|---|---|---|
| Polycarbonate | 45.6 | 44.8 | 45.9 | 44.8 | 44.7 | 43.3 | 41.0 | 44.9 | 45.1 | 45.3 |
| PBT-1 | 28.1 | 28.9 | 27.8 | 27.9 | 27.0 | 26.6 | 25.2 | 27.7 | 28.1 | 28.1 |
| PBT-2 | 14.0 | 14.0 | 14.0 | 14.0 | 14.0 | 13.3 | 12.6 | 13.8 | 14.0 | 14.0 |
| MBS | 11.0 | 11.0 | 11.0 | 11.0 | 11.0 | 10.5 | 10.0 | 10.8 | 11.0 | 11.0 |
| Additive package | 1.3 | 1.3 | 1.3 | 1.3 | 1.3 | 1.3 | 1.2 | 1.3 | 1.3 | 1.3 |
| Lignin | — | — | — | 1.0 | 2.0 | 5.0 | 10.0 | — | — | — |
| EPA-202 | — | — | — | — | — | — | — | 1.5 | 0.5 | 0.25 |
| Tensile Mod. (Mpa) | 2115 | 2190 | 2175 | 2180 | 2150 | 2230 | 2310 | 2210 | 2200 | 2200 |
| Tensile Str. (Mpa) | 53 | 54 | 54 | 54 | 54 | 56 | 52 | 48 | 54 | 54 |
| INI @ 23 C. (kJ/m2) | 46 | 47 | 47 | 44 | 38 | 9 | 6 | 18 | 10 | 44 |
| FD@break −10 C. (J) | — | 130 | 129 | 132 | 106 | — | — | — | 131 | 125 |
| FD@break −20 C. (J) | — | 132 | 138 | 135 | — | — | — | — | 136 | — |
| Vicat (C.) | 121 | 120 | 120 | 119 | 117 | 118 | 116 | 113 | 117 | 117 |
| MVR (ml/10′) | 20.6 | 21.5 | 20.9 | 24.3 | 27.9 | 33.6 | 46.7 | 41.2 | 27.4 | 27.2 |
| MV (Pa · s) | 170 | 154 | — | 139 | 114 | 100 | 67 | 114 | 130 | 131 |

Table 2 PPC/PBT, PPC/PET, and PPC/PCT formulations

TABLE 2

PPC/PBT, PPC/PET, and PPC/PCT formulations

| X | 11(ref) | 12 | 13(ref) | 14 | 15(ref) | 16 |
|---|---|---|---|---|---|---|
| PPC | 67.5 | 67.3 | 67.5 | 67.3 | 67.5 | 67.3 |
| PBT-1 | 18.6 | 18.55 | | | | |
| PBT-2 | 3.9 | 3.9 | | | | |
| PET | | | 22.5 | 22.45 | | |
| PCT | | | | | 22.5 | 22.45 |
| ASA | 8.5 | 8.5 | 8.5 | 8.5 | 8.5 | 8.5 |
| Additive package | 1.5 | 1.5 | 1.5 | 1.5 | 1.5 | 1.5 |
| Lignin | — | — | — | — | — | — |
| EPA-202 | — | 0.25 | — | 0.25 | — | 0.25 |
| Tensile Mod. (Mpa) | 2370 | 2340 | 2250 | 2250 | 2020 | 2010 |
| Tensile Str. (Mpa) | 66 | 65 | 65 | 65 | 61 | 60 |
| MVR (ml/10′) @ 5 kg | 9.0 | 13.8 | 7.7 | 9.9 | 3.6 | 5.3 |
| MV (Pa · s) @ 280 C. | 318 | 262 | 286 | 250 | 491 | 435 |

The results of Table 2 also clearly indicate the positive effect of the phosphonium sulfonate on the flow for blends of polyestercarbonates with different polyesters.

What is claimed is:

1. A molding composition comprising (a) from 10 to 90 weight percent of a polyester resin; (b) from 90 to 10 weight percent of an aromatic polycarbonate, polyarylate, polyester carbonate resin, or blend thereof; and (c) a flow improving amount of a lignin additive and/or a phosphonium sulfonate compound.

2. A molding composition according to claim 1 wherein the lignin additive is selected from the group consisting of lignin, kraft lignin, lignosulfonates, and mixtures thereof.

3. A molding composition according to claim 1 wherein the phosphonium sulfonate compound has the formula

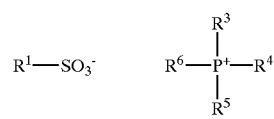

wherein $R^1$ is 1–40 C alkyl or aryl or alkylaryl; and $R^3$–$R^6$ are each H, 1–10C alkyl, or aryl.

4. A molding composition according to claim 1 wherein the phosphonium sulfonate compound is tetrabutylphosphonium dodecylbenzene sulfonate.

5. A molding composition according to claim 1 wherein the polyarylate and polyester carbonate resin are derived from bis phenol A and a mixture of isophthalic acid and terephthalic acid.

6. A molding composition according to claim 1 wherein the polyester is selected from the group consisting of poly (ethylene terephthalate) "PET", poly(1,4-butylene terephthalate), "PBT", poly(propylene terephthalate) "PPT", poly(1,4-cyclohexyl-dimethylene terephthalate) "PCT", poly(1,4-cyclohexyl-dimethylene cyclohexyl dicarboxylate) "PCCD", and mixtures thereof.

7. A molding composition according to claim 1 wherein the polyester carbonate to polycarbonate or polyarylate to polycarbonate weight ratio is 90:10 to 10:90.

8. A molding composition according to claim 1 further comprising an impact modifier selected from the group consisting of methacrylate butadiene rubber; acrylic rubber; and polyolefin copolymers containing acrylic, methacrylic, vinyl ester or vinyl ether derived units.

9. A molding composition according to claim 1 comprising the lignin additive in an amount of 0.1–5 wt %.

10. A molding composition according to claim 1 comprising the phosphonium sulfonate compound in an amount of 0.03–3 wt %.

11. A molding composition according to claim 1 comprising the lignin additive in an amount of 0.3–3 wt %.

12. A molding composition according to claim 1 comprising the lignin compound in an amount of 0.5–2.0 wt %.

13. A molding composition according to claim 1 comprising the phosphonium sulfonate compound in an amount of 0.05–1.5 wt %.

14. A molding composition according to claim 1 comprising the phosphonium sulfonate compound in an amount of 0.1–1.0 wt %.

15. A molding composition according to claim 1 wherein the polycarbonate is present in an amount of 5–95 wt % and the polyester is present in an amount of 95–5 wt %.

16. A molding composition according to claim 1 wherein the polycarbonate and polyester are present in amounts of 40–75 wt % and 25–60 wt %, respectively.

17. A molding composition according to claim 1, wherein the polycarbonate is a polycarbonate ester based on bisphenolacetone and the polyester is a polyester based on terephthalic units and a C2–C15 diol.

18. A molding composition according to claim 1 further comprising impact modifiers and stabilizers.

19. A shaped article comprising the molding composition of claim 1.

20. A method of reducing the melt viscosity of a resin composition, comprising:
blending (a) from 10 to 90 weight percent of a polyester resin; (b) from 90 to 10 weight percent of an aromatic polycarbonate, polyarylate, polyester carbonate resin, or blend thereof; and (c) a flow improving amount of a lignin additive and/or a phosphonium sulfonate compound.

21. A method according to claim 20, wherein the lignin additive is present in an amount of 0.1–5 wt %.

22. A method according to claim 20, wherein the phosphonium sulfonate compound is present in an amount of 0.03–3 wt %.

* * * * *

UNITED STATES PATENT AND TRADEMARK OFFICE
CERTIFICATE OF CORRECTION

| | |
|---|---|
| PATENT NO. | : 6,599,966 B2 |
| APPLICATION NO. | : 09/738497 |
| DATED | : July 29, 2003 |
| INVENTOR(S) | : Penning et al. |

Page 1 of 1

It is certified that error appears in the above-identified patent and that said Letters Patent is hereby corrected as shown below:

On the Title page,

Item [74], "Oppendahl" should read -- Oppedahl --

Signed and Sealed this

Eighteenth Day of May, 2010

David J. Kappos
*Director of the United States Patent and Trademark Office*